E. O. SCHWEITZER.
ELECTRICITY METERING.
APPLICATION FILED DEC. 31, 1915.
1,256,170.
Patented Feb. 12, 1918.
7 SHEETS—SHEET 1.
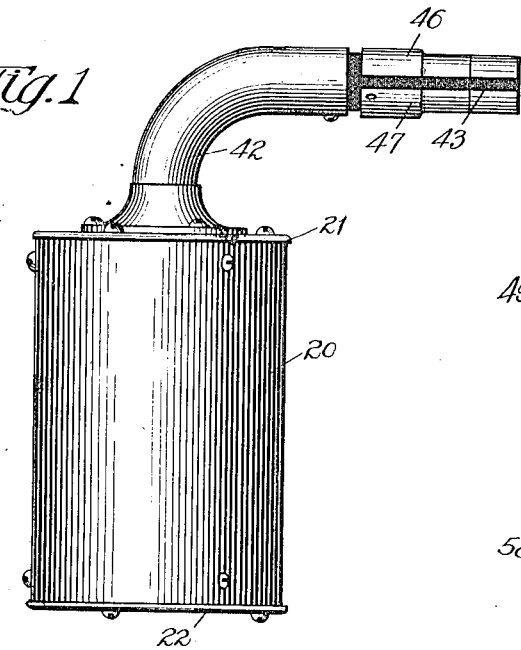
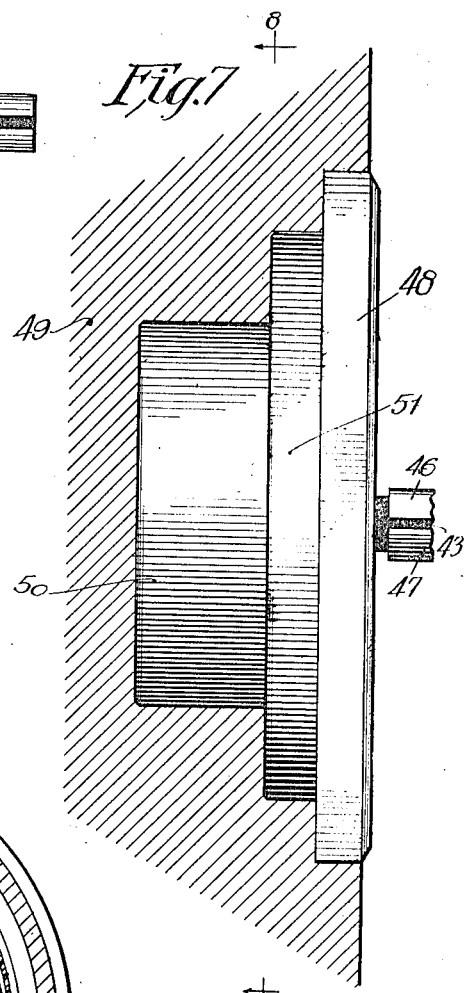
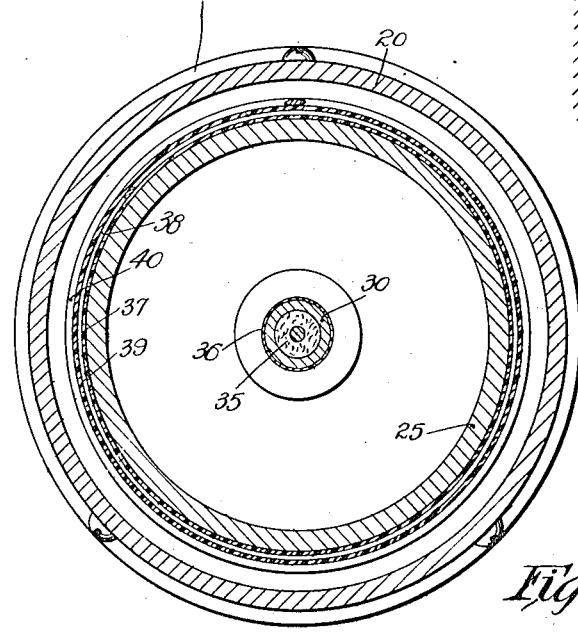
Witnesses:
Albin E. Ahlberg
Robert F. Bracke
Inventor
Edmund O. Schweitzer
By Williams & Bradbury
Attorneys

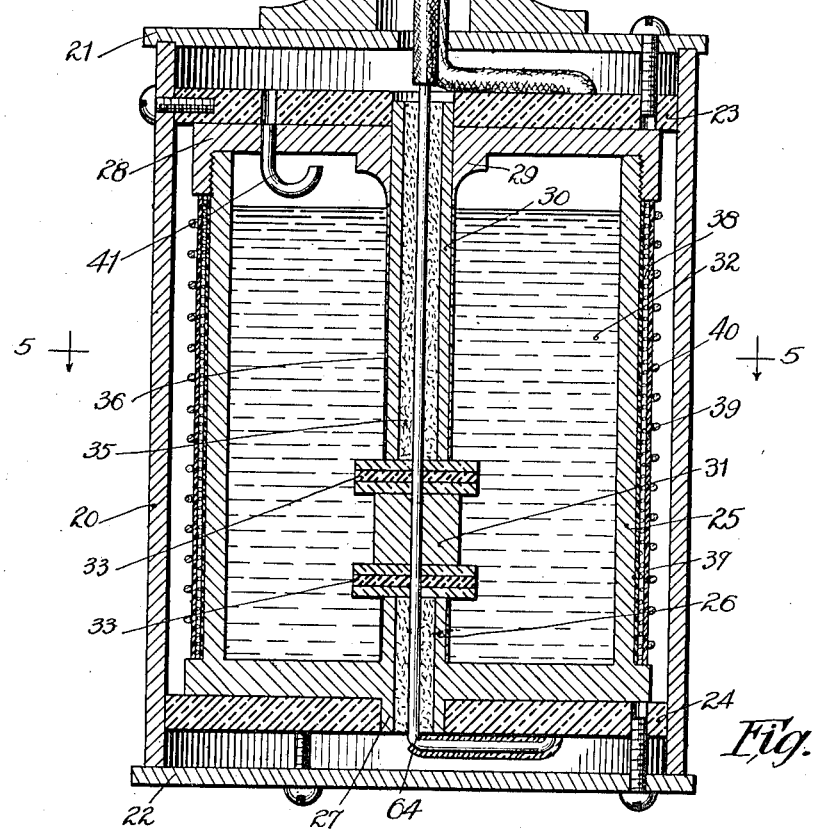

E. O. SCHWEITZER.
ELECTRICITY METERING.
APPLICATION FILED DEC. 31, 1915.
1,256,170.
Patented Feb. 12, 1918.
7 SHEETS—SHEET 3.
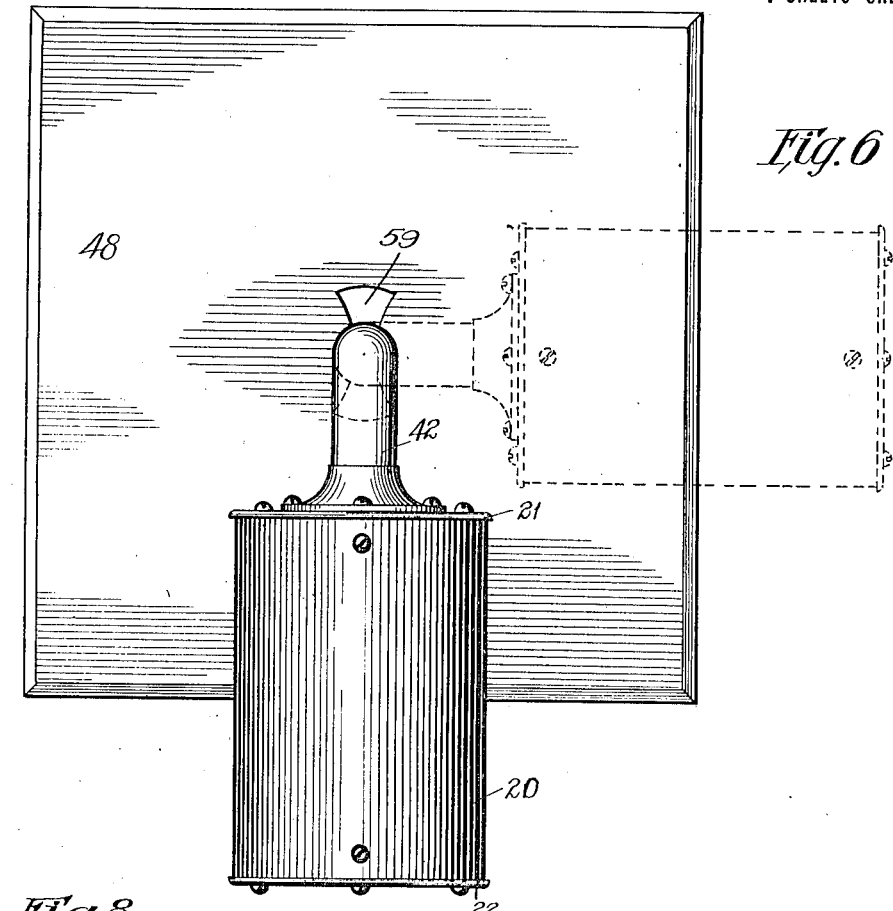
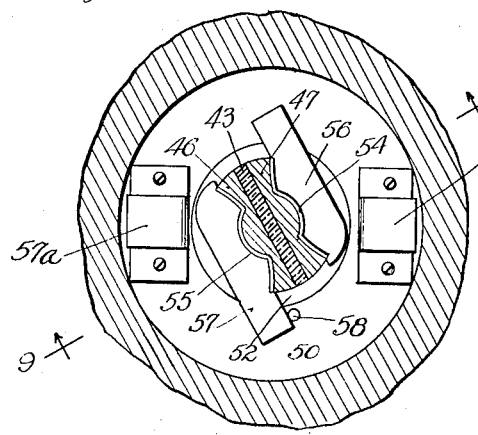
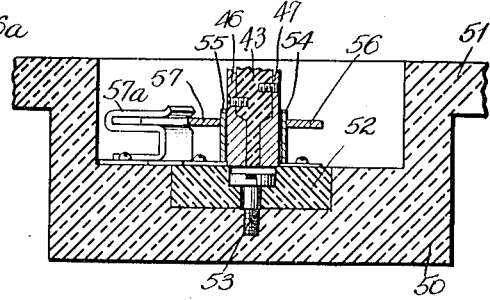
Witnesses:
Albin C. Alberg
Robert F. Bracke
Inventor
Edmund O. Schweitzer
By Williams & Bradbury
Attorneys

E. O. SCHWEITZER.
ELECTRICITY METERING.
APPLICATION FILED DEC. 31, 1915.

1,256,170.

Patented Feb. 12, 1918.
7 SHEETS—SHEET 4.

Witnesses:

Inventor
Edmund O. Schweitzer
By Williams & Bradbury
Attorneys

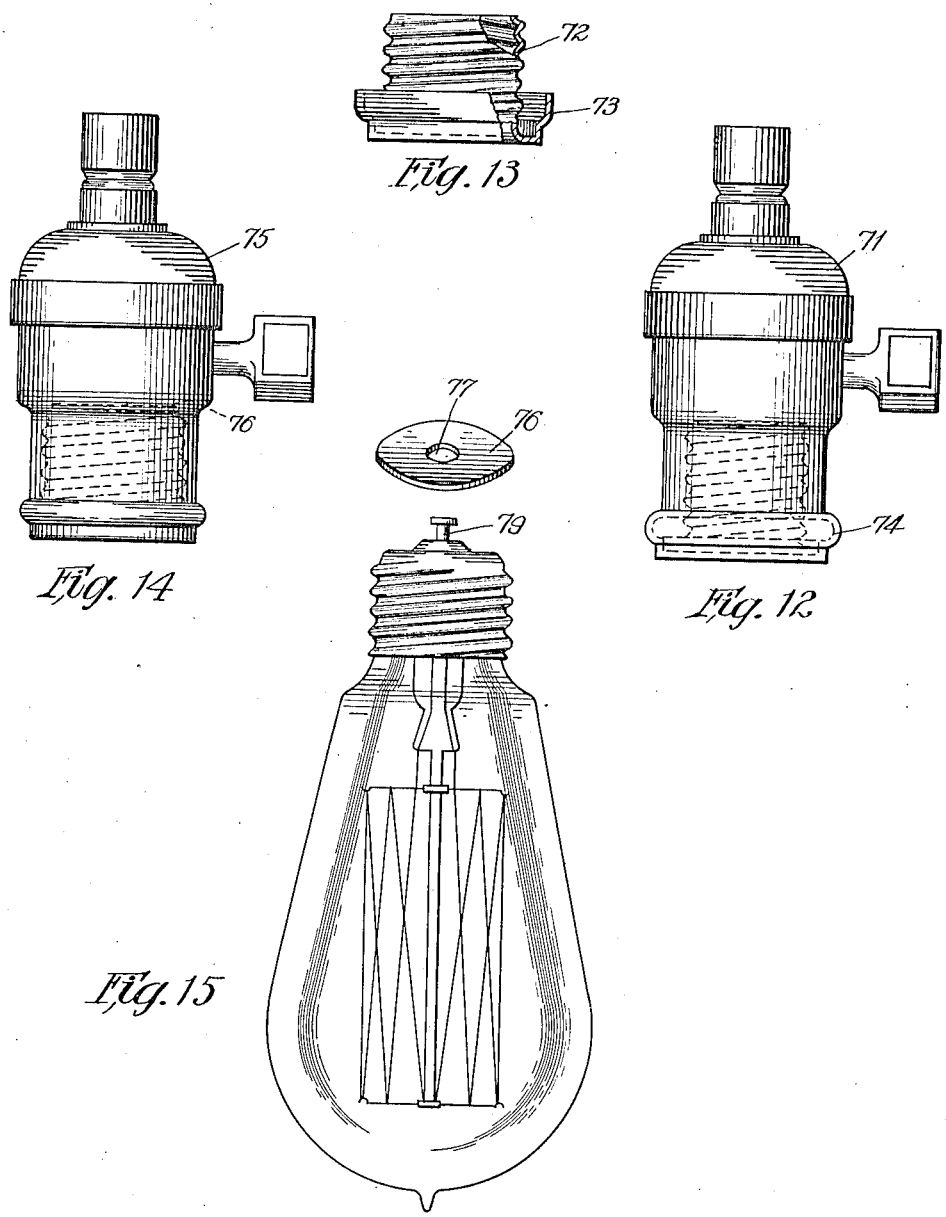

E. O. SCHWEITZER.
ELECTRICITY METERING.
APPLICATION FILED DEC. 31, 1915.
1,256,170.
Patented Feb. 12, 1918.
7 SHEETS—SHEET 6.
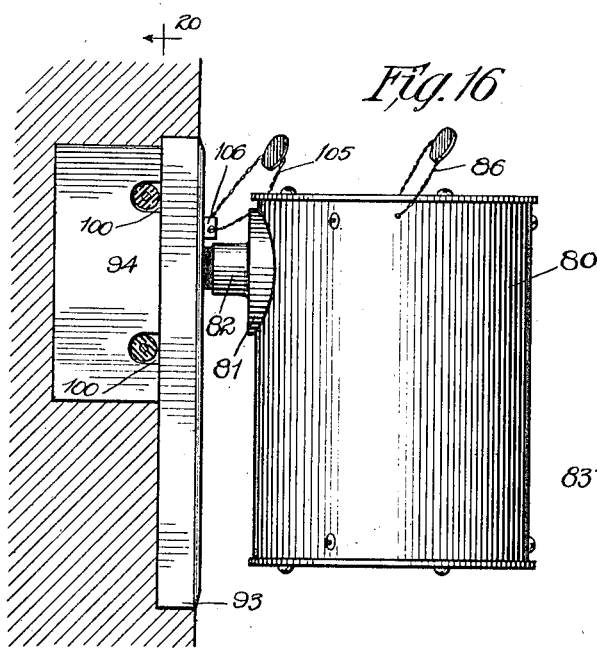
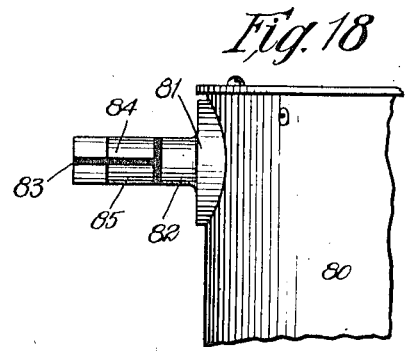
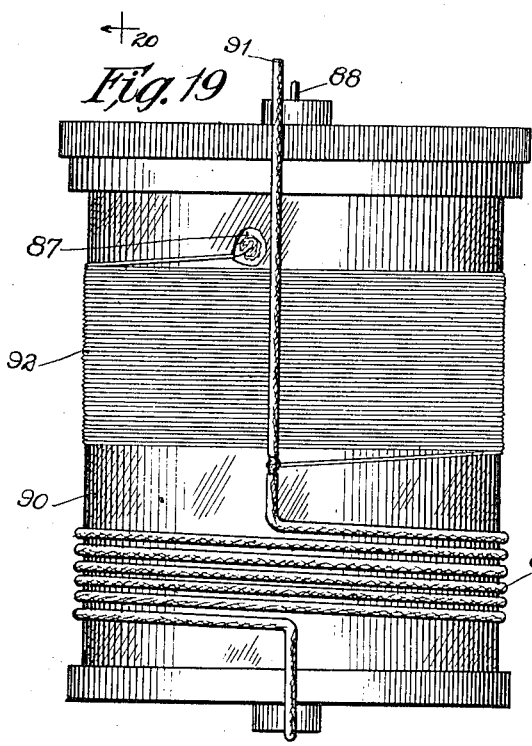
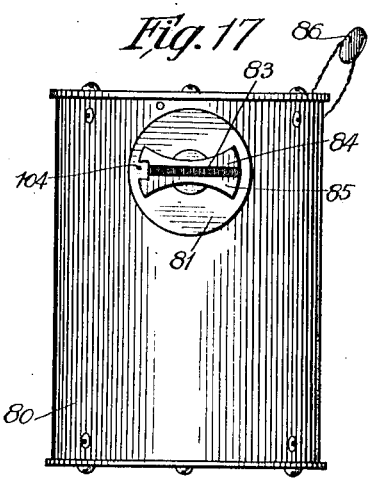
Witnesses:
Albin C. Ahlberg
Robert F. Bracke
Inventor
Edmund O. Schweitzer
By Williams & Bradbury
Attorneys E. O. SCHWEITZER.
ELECTRICITY METERING.
APPLICATION FILED DEC. 31, 1915.
1,256,170.
Patented Feb. 12, 1918.
7 SHEETS—SHEET 7.
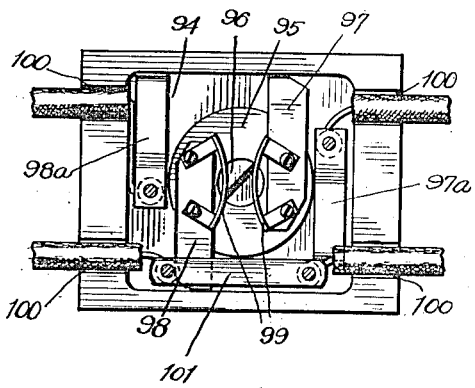
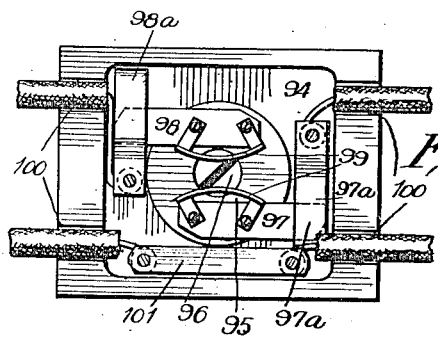
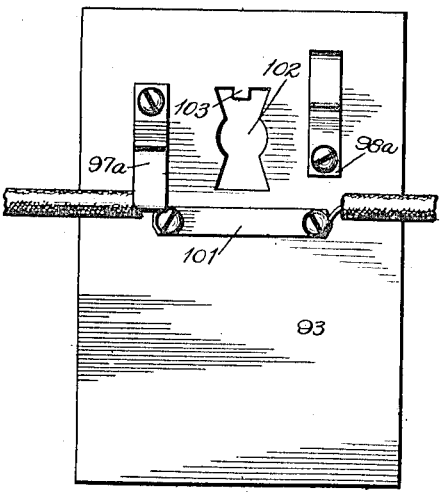
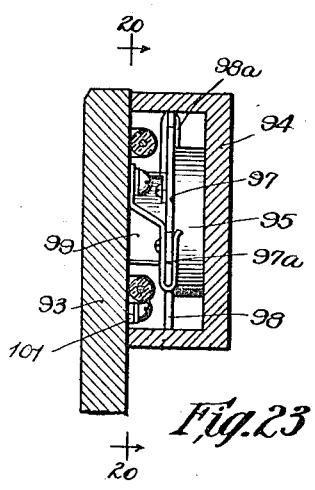
Witnesses:
Albin C. Ahlberg
Robert F. Bracke
Inventor
Edmund O. Schweitzer
By William H. Bradbury
Attorneys

UNITED STATES PATENT OFFICE.

EDMUND O. SCHWEITZER, OF CHICAGO, ILLINOIS.

ELECTRICITY-METERING.

1,256,170.   Specification of Letters Patent.   Patented Feb. 12, 1918.

Application filed December 31, 1915.   Serial No. 69,688.

*To all whom it may concern:*

Be it known that I, EDMUND O. SCHWEITZER, a citizen of the United States, residing at Chicago, in the county of Cook and State of Illinois, have invented a certain new and useful Improvement in Electricity-Metering, of which the following is a full, clear, concise, and exact description, reference being had to the accompanying drawings, forming a part of this specification.

My invention relates to the art of electricity metering and the object of my invention is to provide improved means for accurately metering the consumption of electricity, and more particularly means for affording a satisfactory basis for payment to the central station company by the consumer for electrical energy furnished to and consumed by him.

The systems now generally employed by central station companies not only require expensive equipment subject to rapid deterioration and entailing a high cost for maintenance, but also require office labor and supervision of such a high grade and cost that a considerable portion of the possible earnings of the central station companies, particularly where the customers are scattered over a large area and consume relatively small quantities of electrical energy per month, is not only lost but business of this class is oftentimes done at an actual loss to the central station company.

My invention hereinafter described and claimed, provides a system of electrical measurement and power control particularly applicable without danger of inaccurate measurement or lack of proper control, to that class of business hereinbefore mentioned as unprofitable, and renders such class of business profitable to the central station company. Broadly stated, I accomplish this desirable end by providing means, preferably located at or near the point of energy consumption, arranged and adapted to prevent the further consumption of energy at that point, as by opening or otherwise rendering the load circuit inoperative after a previously determined quantity of electrical current or energy has been consumed.

The specific embodiment of my invention hereinafter described comprises a metering unit arranged to be connected in the subscriber's work circuit. This unit is designed to permit the passage of a certain previously determined quantity of electrical energy. After the aforesaid measured quantity of electricity supply has been completed the circuit for the translating device, or devices, is opened or otherwise rendered inoperative and it then becomes necessary to secure a new unit, or units, of this kind from the central station company.

As will more fully hereinafter appear, I prefer to include in the consumer's work circuit a switch which can only be closed when the metering unit before mentioned is in operative position. This switch is conveniently mounted in a closed housing, or terminal box, which may conveniently be mounted upon a wall or other support, and this housing in the particular embodiment of my invention hereinafter described is provided with a guide for a key forming a part of the metering unit. When the metering unit is to be included in the consumer's work circuit a portion of the metering unit conformed to fit the guide is inserted in the latter and turned therewithin to close the switch before mentioned. Inasmuch as the metering device is arranged to cut off the supply of electricity after a pre-determined quantity of electrical energy has been supplied to the consumer it will be seen that due to the arrangement before mentioned the consumer may obtain service only when the metering device is in operative position and then only to the extent provided by the metering device which is arranged to cut off the supply of electrical energy after a pre-determined measured quantity of electricity has been supplied to the consumer.

The metering units are designed to be interchangeable and I have found that before the energy supplied to the consumer's translating device, or devices is cut off the consumer should be notified that this is about to happen. Accordingly, I provide means for giving the consumer ample notice in order that he may purchase and substitute a new metering unit before his electricity supply is entirely cut off.

I recognize and utilize the electrolytic action of an electric current in accomplishing the opening of the consumer's load circuit after the passage of a measured quantity of electricity supply. A preferred arrangement for accomplishing this end is to include in series with the consumer's load circuit a conductor, for instance, a cylinder of copper which forms the anode of an electrolytic cell. An electrolytic circuit is established when the load circuit is in use, as, for instance, by establishing a shunt circuit including the electrolytic cell across the conductors leading to the translating devices. The resulting electrolytic action effects the gradual disintegration and dissolution of the copper cylinder as the consumption of electricity continues. The arrangement is such that the copper cylinder is completely dissolved after a pre-determined quantity of electricity has been consumed and the circuit for the translating device, or devices, is thus opened. The structural details of the metering apparatus and the several circuit connections will be more fully hereinafter described.

In the accompanying drawings illustrating my invention,

Figure 1 is an elevational view of a metering unit embodying my invention;

Fig. 2 in an enlarged vertical axial sectional view thereof;

Fig. 3 is a sectional view of the upper portion of the meter unit shown as broken away in Fig. 2;

Fig. 4 is a view in end elevation of the key which forms a part of the meter unit.

Fig. 5 is a horizontal sectional view taken on the line 5—5 of Fig. 2 and looking in the direction indicated by the arrows.

Fig. 6 is a front elevational view of the housing for the switch mechanism with which the meter unit coöperates, the meter unit being in this figure illustrated in dotted lines in the position which it assumes when the key forming a part thereof is inserted to engage the switch mechanism, the operative position of the meter unit being illustrated in full lines;

Fig. 7 illustrates the housing for the switch mechanism positioned in the wall of a building, a portion of the meter unit being in this figure shown in fragmentary elevation.

Fig. 8 is a fragmentary sectional view taken on the line 8—8 of Fig. 7 and looking in the direction indicated by the arrows, the positions of the several parts illustrated being those which are assumed when the meter unit is in the position indicated by dotted lines in Fig. 6.

Fig. 9 is a fragmentary sectional view taken on the line 9—9 of Fig. 8 and looking in the direction indicated by the arrows.

Figure 10:
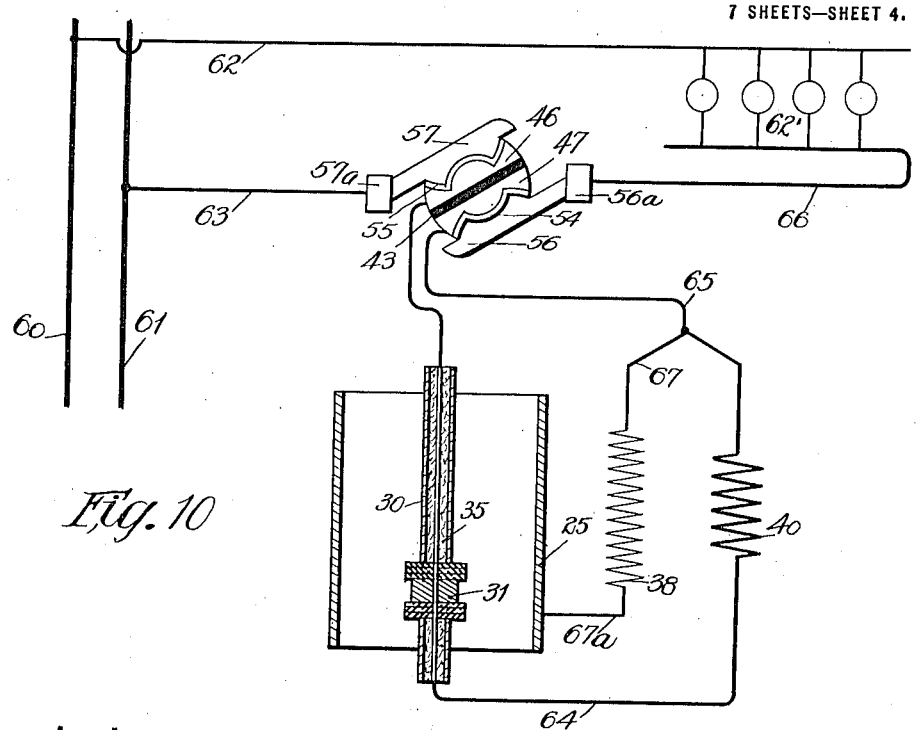
Fig. 10 is a diagrammatic representation of the circuit connections which may be employed in connection with the several devices illustrated in the preceding figures.

Figs. 12 to 15, both inclusive, illustrate ordinary sockets or receptacles provided with means for rendering them incapable of receiving an ordinary plug. The purpose of providing these devices will appear as the following description progresses.

Fig. 16 is an elevational view illustrating a modified and more compact form of meter unit, the meter unit being illustrated as in operative position, and coöperating with a preferred form of switch mechanism.

Fig. 17 is an elevational view of the meter unit shown in Fig. 16.

Fig. 18 is a fragmentary side elevational view thereof.

Fig. 19 is an isolated elevational view of the electrolyte container and cathode, which forms a part of the meter unit shown in Figs. 16 to 18, both inclusive, the particular purpose of this figure being to illustrate how the series and shunt resistance windings are mounted upon the cathode cylinder.

Fig. 20 is a detail view of the switching mechanism of Fig. 16, Fig. 20 being taken on the lines 20—20 of Figs. 16 and 23, and looking in the direction indicated by the arrows.

Fig. 21 is a rear elevational view of the plate or escutcheon behind which the movable parts of the switching mechanism are mounted.

Fig. 22 is a view similar to Fig. 20, but showing the movable switching parts in changed position, and Fig. 23 is a cross-sectional view of the switching mechanism illustrating how the switch blades coöperate with their respective switch jaws.

Similar characters of reference refer to similar parts throughout the several views.

Referring first to Figs. 1 to 5 inclusive, I have illustrated at 20 a metal cylinder designed to constitute the housing for the meter unit, this cylinder being provided with suitable heads, or end closures, 21 and 22. Disposed within the cylinder 20 intermediate the heads 21 and 22 are the spaced disks 23 and 24 both of which are of suitable insulating material and are held in position by screws or other suitable instrumentalities, as illustrated. Disposed between the insulating disks 23 and 24 and by the latter insulated from the metal cylinder 20 is a copper cylinder 25 which, as will presently appear, constitutes the cathode of an electrolytic cell. The lower head, or end closure, for the copper cylinder, or cathode, 25 is preferably formed integral with the latter, or otherwise permanently fixed thereto, as is most clearly illustrated in Fig. 2. The lower head, or end closure, just mentioned is provided with a pair of co-axial hollow central bosses 26 and 27 the first one of which extends upwardly into the interior of the chamber formed by the cylinder 20, the other of which extends down into a suitable aperture formed in the lower one of the insulating disks 24 whereby the cathode cylinder 25 is centered and supported within the housing afforded by the cylinder 20. The upper end of the cathode cylinder 25 is provided with a cap 28 arranged to coöperate with threads formed upon the upper end of the cathode cylinder 25 as illustrated. The cap 28 provides a hollow inwardly extending central boss 29 into which is fitted and secured the upper end of a tube or hollow rod 30 which extends downwardly into the chamber afforded by the cylinder 20 when the cap is in the position illustrated in Fig. 2, and also is provided with a portion extending beyond the upper surface of the cap to engage in a suitable aperture formed in the upper insulating disk 23 when the several parts are in assembled position. Disposed intermediate the upper end of the central boss 26 of the bottom of the cylinder 25 and the lower end of the hollow tube 30 is a copper cylinder 31 which, as will presently appear, constitutes the anode of the electrolytic cell previously referred to. As will presently hereinafter appear the copper cylinder 31 is of a predetermined weight or mass and is included in series with the consumer's work circuit. In Fig. 5 the conductor whereby the cylinder 31 is thus connected in the consumer's work circuit is shown as passing through the cylinder 31 and sweated therein. The cylinder 31 to all intents and purposes constitutes an enlarged portion of the conductor which is exposed to mechanical contact with a suitable electrolyte 32 contained within the cathode cylinder 25 and which electrolyte is conveniently in the form of a neutral copper sulfate solution. Disposed adjacent each end of the anode cylinder 31 are three disks arranged to prevent the electrolyte solution from entering the tube 30 or the hollow boss 26. The central one of the three disks is in each instance indicated by the reference numeral 33 and is formed of fiber, hard rubber, or some other suitable insulating material. the disks on either side of the fiber disks 33 being formed of rubber, rubber fabric or some other yielding insulating material.

From the foregoing description it will be seen that by tightening the cap 28 upon the top of the cathode cylinder 25 the anode 31 may readily be tightened in operative position. The conductor which serves to connect the anode 31 in series with the consumer's work circuit passes through the bosses 26 and 27 and the hollow tube 30 and is preferably embedded in paraffin, or some other suitable insulating compound, illustrated at 35. If the hollow central boss 26 and the tube 30 are of electricity conducting material those portions thereof which are exposed to mechanical contact with the electrolyte are coated with enamel, or otherwise insulated from the electrolyte. This enamel or insulation is illustrated at 36 in Figs. 2 and 5.

I shall not at this point go into a detailed description of the several circuit connections, but I will explain how the several windings, etc., are mounted within the meter unit. Disposed around the outer cylindrical surface of the cathode cylinder 25 is a layer of insulation 37 upon which is wound a resistance winding 38 which may, as will be pointed out in connection with the description of Fig. 10, be connected in a shunt circuit with the anode and cathode of the electrolytic cell. Disposed around the resistance winding 38 is a second layer of insulation 39 upon which is wound a second resistance winding 40 which, when the circuit connections of Fig. 10 are employed, is connected in series with the consumer's work circuit. The cap 28 for the cathode or electrolyte container 25 desirably carries a capillary tube 41 registering with a vent in the upper insulating disk 23 to permit the escape of vapor from the top of the electrolyte container.

Carried by the upper cap or end closure 21 of the cylinder 20 is a hollow arm 42 which extends upwardly from the cap 21 and is then turned so that the extremity of the arm lies in a plane substantially at right angles to the axis of the cylinder 20. At this point I will state that the arm 42 serves as a closed conduit for the conductors which connect the several elements of the meter unit with the consumer's circuit and that the arm 42 also serves to carry a key which operates a switch included in the consumer's circuit, the said key coöperating with the switch and the conductors which extend through the arm 42 to establish the proper circuit conditions. As is most clearly illustrated in Figs. 1, 3 and 4, the free end of the arm 42 has a block of insulation 43 secured therein by a suitable set screw 44, this block of insulation being given the conformation illustrated in Figs. 3 and 4 and provided on either side with a plate secured thereto by suitable screws 45—45, as illustrated. The plates referred to, which I illustrated at 46 and 47, are connected with the conductors which extend through the arm 42 and with the insulation interposed between them constitute a key adapted to operate a novel switch the description of which will be next taken up.

Referring now to Figs. 6, 7, 8 and 9, I have illustrated at 48 a plate or escutcheon arranged to be mounted upon or against a wall 49, as illustrated in Fig. 7. Carried by the plate 48 is a cylindrical housing 50 constructed of insulating material which is conveniently provided with a flange 51 secured to the rear face of the escutcheon 48 by screws, or other suitable instrumentalities. Pivotally mounted within the switch housing 50 is a disk 52 constructed of insulating material and retained in position for rotation within a circular depression in the rear wall of the housing by a screw 53. Fixed upon the disk 52 are the two oppositely disposed jaws 54 and 55, each of which has formed integral therewith, or soldered thereto, a switch blade, which switch blades are illustrated at 56 and 57. Attention is directed to the fact that the jaws 54 and 55 are so conformed that the space between them corresponds to the cross section of the key carried by the meter unit so that the said key may be inserted between the jaws in such a manner that the conductor plates forming a part of the key are brought into electrical contact with the jaws aforesaid.

As most clearly illustrated in Figs. 8 and 9 the rear wall of the switch housing 50 carries a pair of stationary switch jaws 56$^a$ and 57$^a$ arranged to coöperate with the switch blades 56 and 57 respectively. At 58 in Fig. 8 is illustrated a stop pin against which the end of the switch blade 56 is designed to abut.

Coming now to a description of the manner in which the meter unit coöperates with the switch mechanism illustrated in Figs. 6 to 9 inclusive, it will be seen by referring to Fig. 6 that the escutcheon 48 provides a key guide 59 shaped to correspond to the cross section of the key formed upon the end of the tube 42 carried by the meter unit. Assuming the switch elements to be in the positions illustrated in Fig. 8, that is with the blades out of engagement with their coöperating jaws, the key carried by the meter unit is inserted in the aperture 59, it being necessary to place the meter unit in the position indicated in dotted lines in Fig. 6 in order to thus insert the key. Fig. 8 represents the position of the switch elements when the meter unit is in the position shown in dotted lines in Fig. 6. By turning the meter unit from the position shown in dotted lines in Fig. 6 through an angle of ninety degrees to the position illustrated in full lines the switch blades 56 and 57 are brought into electrical engagement with the coöperating switch jaws 56$^a$ and 57$^a$.

Having now described rather fully the purely structural features of my improved meter unit and the switching mechanism with which it coöperates, I will refer to Fig. 10 and describe the circuit connections and the operation of the electrolytic meter unit. In Fig. 10, 60 and 61 illustrate the mains through which electrical energy is furnished to the central station company's subscribers and 62 and 63 represent conductors connected with the mains 60 and 61 and leading to the consumer's translating device, or devices, the load in the present figure being represented by a series of lamps 62′ connected in the consumer's work circuit in the usual manner. The conductor 63 leads to the stationary switch jaw 57$^a$ of the switching mechanism previously described. From the switch jaw 57$^a$ the circuit may be traced through the switch blade 57 and the jaw carried therewith to the conductor plate 46 forming a part of the key carried by the meter unit; thence by conductor 64 down into the meter unit, the anode cylinder 31 being connected in series with the conductor 64; thence from the anode cylinder 31 to the series resistance 40; thence by conductor 65 to the conductor plate 47 forming a part of the key carried by the meter unit; thence through the switch blade 56 and its associated stationary switch jaw 56$^a$ and conductor 66 to the translating devices; and thence by conductor 62 to the main 60. It will be seen that the anode cylinder 31 and the resistance winding 40 are connected in series with the consumer's load. One end of the resistance winding 38 is connected with the conductor 65 at a point intermediate the resistance winding 40 and the terminal of the meter unit by a conductor 67, the opposite end of the resistance coil 38 being connected by conductor 67$^a$ with the cathode cylinder 25. It will thus be seen that a shunt circuit is established including the anode 31, the electrolyte, the cathode cylinder 25 and the resistance 38. I will state at this point that in operation with a 114 volt direct current I have found that the series winding 40 should have a resistance of substantially .25 ohms and that the winding 38 should have a resistance of substantially 225 ohms, the internal resistance of the electrolyte cell being approximately 25 ohms. These resistances and proportions are merely given for the purpose of explanation and it will be understood that the resistance and the relation of the resistances may be varied within wide limits without departing from my invention.

In the operation of the metering device the current traversing the consumer's work circuit passes through the anode cylinder 31 and the series resistance 40. Due to the difference in potential accomplished by inserting the resistance 40 in series with the anode cylinder 31 and the consumer's load an electrolytic circuit is established from the anode 31 through the electrolyte to the cathode cylinder 25 and thence through the resistance winding 38. The value of the current traversing the electrolytic circuit just mentioned bears a substantially constant relation to the current traversing the consumer's work circuit. I have found that the 225 ohms resistance included in the shunt or electrolytic circuit serves to greatly minimize the effect of variation in the resistance of the electrolytic cell itself.

In the operation of the metering device the copper cylinder, or anode, 31 is dissolved into the electrolyte and deposited upon the cathode 25 and when the cross section of the cylinder 31 becomes very small the slender wire or thread remaining breaks. I have found that after this break occurs current continues to flow between the broken ends by electrolytic conduction and from time to time the deposit will breach the ends for a moment and then break away causing the lamps, in case lamps are included in the consumer's work circuit, to flicker distinctly. When this flicker occurs the consumer is notified that his energy supply is about to be cut off and that it is time for him to substitute a new meter unit for the one in use. I have also found that after the consumer's work circuit has been opened by the dissolution of the copper anode 31 the heating of the separated ends tends to melt the paraffin surrounding the same and the paraffin flows over the ends of the separated conductors and effectually stops further current flow.

When the circuit arrangement illustrated in Fig. 10 is made use of the meter unit accurately measures the main current regardless of the resistance in the translating device, or devices, the dissolution of the copper anode 31 bearing a substantially constant relation to the flow of current through the translating devices.

Figure 11:
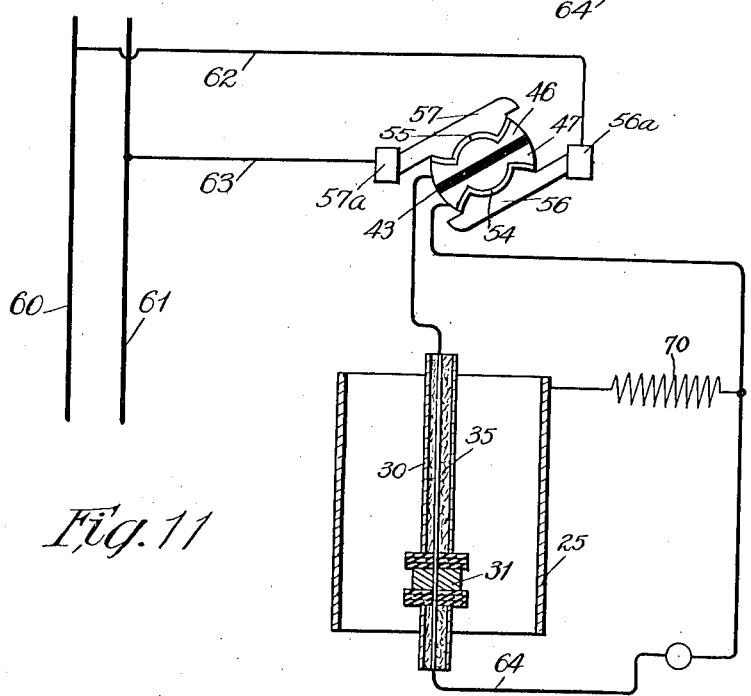
Fig. 11 illustrates a modified circuit arrangement.

In Fig. 11 is illustrated a somewhat modified circuit arrangement. The same reference characters have been applied to the corresponding parts as in Fig. 10 and in describing this figure I shall merely refer to the differences between the connections shown in Figs. 10 and 11. In Fig. 11 it will be seen that the copper anode cylinder 31 is connected in series with the consumer's work circuit, but that no series resistance is provided, the electrolytic circuit being established through a shunt circuit including a high resistance winding 70. When the circuit arrangement shown in this figure is made use of the meter unit accurately measures the main current only so long as the resistance in the translating device, or devices, remains approximately constant. The current flowing through the shunt circuit depends upon the line voltage and the value of the resistance 70 and does not vary directly with the current through the translating device, or devices as is the case when the circuit arrangement of Fig. 10 is made use of. I will state that in operating with the circuit arrangement of Fig. 11, employing 114 volt direct current and maintaining a substantially constant load, I have found that the winding 70 should desirably have a resistance of between 21,000 and 42,000 ohms. The energy utilized in the shunt or electrolytic circuit becomes smaller as the resistance of the winding 70 is increased. However, the resistance of the winding 70 cannot be made a great deal more than 42,000 ohms under the conditions I have described for the reason that this would necessitate an extremely small anode and an extremely small clearance between the anode and the cathode. The extremely accurate measurements which would then be required in determining the size of the anode for any desired meter unit would then be prohibitive.

When the circuit arrangement of Fig. 11 is made use of it is desirable that the consumer's outlet be equipped so that no other translating device, or devices, other than those for whose use he has contracted can be connected in the load circuit. In Figs. 12 to 15 inclusive I have illustrated two arrangements whereby this end may be accomplished. In Fig. 12 I have illustrated at 71 an ordinary socket, or receptacle, provided with means for adapting the socket for use in connection only with a special plug with which the translating device is provided. The means employed in this instance is an internally and externally threaded sleeve 72 provided with a suitable flange 73 arranged to be bent in over the bead 74 of the socket by means of a special tool. When the socket 71 is provided with a sleeve 72, as illustrated, the socket is no longer capable of receiving an ordinary plug but will only receive the special plug with which the proper translating device is provided.

In Fig. 14 I have illustrated at 75 an ordinary socket, or receptacle, provided with a modified means for adapting it for use only with a special plug with which the proper translating device is provided. The means employed in this instance is a disk 76 forced up into the socket 75, the said disk being provided with a central aperture 77. When this arrangement is used the plug of the translating device is provided with a suitable stem capable of being passed through the aperture 77 of the disk when the plug is threaded into the receptacle. In Fig. 15 I have shown both the disk 76 and a translating device in the form of a lamp equipped with a stem 79 arranged to be so threaded through the aperture 77 in one of the disks 76.

The arrangements illustrated in Figs. 12 to 15, both inclusive, are merely representative and it will be understood that various arrangements of this kind may be devised to accomplish the same end.

Referring now to Figs. 16 to 19, both inclusive, it will be seen that the cylinder 80, constituting the housing for the meter unit, is provided near its upper end with an integral boss 81, from which projects a hollow tubular element 82 corresponding to the arm 42 of the meter unit, illustrated in Fig. 1. The element 82 is provided at its outer end with a key comprising the insulation 83 and conductor plates 84 and 85, connected with the parts within the meter unit by conductors extending through the hollow tubular element 82 in precisely the same manner as were the corresponding conductor plates 46 and 47 of the meter unit illustrated in Fig. 1 and succeeding figures. The lower cap or end closure of the cylinder 80 is desirably non-removable. The upper cap or end closure for the cylinder 80 is conveniently removable, and in case this upper cap or end closure is thus made removable I find it desirable to provide means for sealing the cap against removal by the consumer or other unauthorized persons. The cap is conveniently sealed against removal by one or more wire seals, one of which is illustrated at 86. It will be seen that the wire portion of this seal extends through an aperture in the upper cap or end closure of the cylinder 80 and through an aperture in the upper end of the cylinder 80.

The internal construction of the meter unit shown in Figs. 16 to 19, both inclusive, is for the most part precisely like that of the meter unit shown in the figures previously described. However, I have in Fig. 19 illustrated a preferred arrangement for mounting the series and shunt resistance windings upon the cathode cylinder, which is illustrated at 87. In this figure 88 represents the conductor in series with which the anode is connected, and it will be noted that the conductor 88 after passing through the lower cap or inclosure of the cathode cylinder 87 connects with the comparatively heavy and suitably insulated series resistance 89. The outer cylindrical surface of the cathode cylinder 87 is provided with a layer of mica or other insulating material illustrated at 90. A conductor 91 is connected with the series resistance 89 as illustrated, and it will be understood that the conductors 88 and 91 are electrically connected with the conductor plates 84 and 85 forming a part of the switch key carried by the outer cylinder 80 of the meter unit. The shunt resistance 92 is wound around the mica 90, as illustrated in Fig. 19, one end of the resistance 92 being electrically connected with the conductor 91 and the other end of said winding 92 being soldered to the outer surface of the cathode cylinder 87, a part of the mica insulation being conveniently cut away to permit the end of the winding 92 to be soldered to the cathode cylinder 87, as before explained.

The switching mechanism illustrated in Fig. 16 and Figs. 20 to 23, both inclusive, comprises the face plate or escutcheon 93 and the box 94, which constitutes a housing for the movable parts of the switching mechanism. The plate 93 and boss 94 are secured together in any convenient manner. I have chosen to illustrate the housing 94 and the plate 93 as constructed of insulating material, but it will be understood that this need not necessarily be the case, inasmuch as the parts which constitute the housing for the switching mechanism may be constructed of any suitable material, the electricity conducting parts of the switch being insulated from the housing in case the housing is constructed of conducting material.

Now, within the housing 94 is a disk 95 which is constructed of insulating material and is pivoted by means of a screw 96. Carried by the rotatable disk 95 is a pair of movable switch blades indicated at 97 and 98. The switch blades 97 and 98 are designed to coöperate with stationary switch jaws 97$^a$ and 98$^a$, carried on the rear face of the escutcheon plate 93, as most clearly illustrated in Fig. 21. Each of the switch blades 97 and 98 has mounted thereon and electrically connected therewith a curved spring plate 99, and it will be seen that the plates 99 constitute a jaw or receptacle for the key carried by the meter unit, each of the spring plates 99 being adapted to make contact with one of the conductor plates forming a part of the key structure.

Apertures 100—100 are formed in the switch housing 94 to permit suitable conductors to pass therethrough, as illustrated, and it will be seen that one pair of conductors are connected with the stationary switch jaws 97$^a$ and 98$^a$ while the other pair of conductors are connected with a small bus bar or jumper 101, carried upon the rear face of the escutcheon plate 93, as is most clearly shown in Fig. 21.

The key forming a part of the meter unit is arranged to be inserted through an aperture 102 formed in the escutcheon 93 directly in front of the rotatable disk 95. At the time of inserting the key the several switch elements are in the position illustrated in Fig. 20, and after the key is inserted are turned to the positions illustrated in Fig. 22 to establish the circuit connections shown and fully described in connection with the description of Fig. 10.

In order to prevent a consumer from intentionally or accidentally inserting the key into the aperture 102 in such a way as to permit operation of the switch blades in the wrong direction I preferably provide the escutcheon 93 with a bead 103, which projects into the aperture or keyway 102. A slot 104 formed in one side of the key carried by the meter unit permits proper insertion of the key into the keyway 102, but it will be seen that the bead 103 prevents insertion of the key except when the key is placed in such position that the slot 104 is brought opposite the bead. It will be understood that various means may be resorted to in order to prevent improper operation of the switch mechanism. The essential thing to be accomplished in this connection is to prevent the switch from being so operated as to reverse the polarity of the electrolytic cell forming a part of the meter unit.

In some cases it may be desirable that the meter unit be removable from the switching mechanism, with which it coöperates, only by the employees or agents of the central station company. In such cases I find it desirable to provide means for sealing the meter unit to the housing for the switching mechanism. In Fig. 16 I have illustrated a seal at 105, the wire portion of this seal extending through an aperture in a lug 106 carried by the escutcheon 93 as well as suitable apertures formed in the cylinder 80 of the meter unit and the upper cap or end closure for the said cylinder 80.

From the foregoing description it will be seen that I have provided means for accurately measuring the current flowing through a consumer's load circuit and for cutting off the supply of energy after a pre-determined measured quantity of energy has been supplied, moreover, that the measuring means is in the form of a unit which may be readily connected in and removed from the circuit and that the consumer's work circuit is renered operative only when an operative unit is connected in operative relation to the consumer's work circuit.

Having thus described my invention what I claim as new and desire to secure by Letters Patent of the United States is:

1. In a system of electrical distribution the combination with a consumer's load circuit, an inclosed switch controlling said circuit, a meter unit having a contact key arranged to coöperate with said switch to close the load circuit through the meter, said switch having a key-way arranged to permit said contact key to be disengaged from said switch when and only when said switch is in open position.

2. In a system of electrical distribution the combination with a consumer's circuit, a switch in said circuit, a closed housing for said switch provided with a key-way, and a metering device carrying a contact key adapted to be inserted in said key-way and arranged to coöperate with said switch to render the circuit for the translating device operative and establish the proper circuit connections for the metering device, said key-way arranged to prevent withdrawal of the contact key except when said switch is in open position.

3. In a system of electrical distribution, a load circuit, a switch in said load circuit, a meter comprising as a part thereof a device arranged to coöperate with said switch to move the latter from open to closed position and vice versa and thereby to open and close the load circuit and the meter connections and means for preventing said device from being disengaged from the switch except when the latter is in open position.

4. In a system of electrical distribution, a load circuit, a switch in said load circuit, a closed housing within which said switch is mounted, said housing having a key-way, a meter comprising as a part thereof a device arranged to extend through said key-way and to coöperate with said switch to move the latter from open to closed position and vice versa; and thereby to open and close the load circuit and the meter connections, said key-way arranged to prevent withdrawal of the contact key except when said switch is in open position.

5. In a system of electrical distribution the combination with a load circuit, a closed housing provided with a key-way, a metering device comprising as a fixed part thereof a contact key adapted to be inserted in said key-way, and means within said housing adapted to coöperate with said contact key to establish the proper circuit connections for the metering device and insuring that the load circuit is rendered operative when and only when the metering device is included in circuit.

6. In a system of electrical distribution the combination with a load circuit, a closed switch housing having a key-way formed in one of the walls thereof, a switch included in said circuit and located in said housing, and a meter unit comprising as a fixed part thereof an arm carrying a contact key arranged to be inserted in said key-way to operate the aforesaid switch to render the circuit operative and establish the proper circuit connections for the meter unit, said switch and contact key insuring that the load circuit is rendered operative when and only when the meter unit is included in circuit.

7. In a system of electrical distribution the combination with a load circuit, a closed switch housing having a key-way formed in one of the walls thereof, a switch included in said circuit and located in said housing, and an electrolytic cut-out meter unit comprising as a fixed part thereof an arm having a contact key adapted to be inserted in said key-way to operate said switch to close the load circuit through the meter unit, said switch and contact key insuring that the load circuit is rendered operative when and only when the meter is also included in circuit.

8. In a system of electrical distribution the combination with a load circuit, a closed housing, a key-way formed in said housing, a switch in said housing located opposite said key-way and comprising a rotatable element carrying a pair of jaws, switch blades carried by said jaws, stationary switch elements adapted to coöperate with said switch blades, a meter having as a fixed part thereof a contact key comprising a pair of contact plates insulated from each other and each adapted to engage one of the jaws aforesaid whereby the switch may be operated to render the load circuit operative and establish the proper circuit connections for the meter, said switch and contact key insuring that the load circuit can be closed when and only when the meter is also included in circuit.

In witness whereof, I hereunto subscribe my name this 29th day of December, A. D. 1915.

EDMUND O. SCHWEITZER.

Witnesses:
 ALBERT G. McCALEB,
 ALBIN C. AHLBERG.